United States Patent
Lhomme et al.

(10) Patent No.: US 7,731,284 B2
(45) Date of Patent: *Jun. 8, 2010

(54) CHILD RESTRAINT WITH SWIVELING JUVENILE SEAT HAVING A SEAT-ANCHOR GUIDE CHANNEL

(75) Inventors: Gilles Lhomme, Chateau D'Olonne (FR); Richard Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 160 days.

This patent is subject to a terminal disclaimer.

(21) Appl. No.: 11/948,595

(22) Filed: Nov. 30, 2007

(65) Prior Publication Data

US 2009/0033132 A1    Feb. 5, 2009

Related U.S. Application Data

(60) Provisional application No. 60/953,110, filed on Jul. 31, 2007.

(51) Int. Cl.
A47C 1/08        (2006.01)

(52) U.S. Cl. .............. 297/256.12; 297/250.1; 297/256.1; 297/256.16

(58) Field of Classification Search ........... 297/256.12, 297/256.16, 256.1, 250.1
See application file for complete search history.

(56) References Cited

U.S. PATENT DOCUMENTS

| | | |
|---|---|---|
| 1,756,807 A | 4/1930 | Black et al. |
| 2,153,155 A | 4/1939 | Page et al. |
| 2,182,598 A | 12/1939 | Owler |
| 2,229,608 A | 1/1941 | Ragsdale et al. |
| 2,374,848 A | 5/1945 | Wohlk |
| 2,583,372 A | 1/1952 | Hall |
| 2,712,346 A | 7/1955 | Sprinkle |
| 2,725,921 A | 12/1955 | Markin |
| 2,859,797 A | 11/1958 | Mitchelson |
| 3,404,917 A | 10/1968 | Smith |
| 3,567,280 A | 3/1971 | Bradshaw |
| 3,596,986 A | 8/1971 | Ragsdale |
| 4,058,342 A | 11/1977 | Ettridge |
| 4,113,306 A | 9/1978 | von Wimmersperg |
| 4,205,877 A | 6/1980 | Ettridge |
| 4,345,791 A | 8/1982 | Bryans et al. |
| 4,362,336 A | 12/1982 | Zapf et al. |
| 4,452,486 A | 6/1984 | Zapf et al. |
| 4,480,870 A | 11/1984 | von Wimmersperg |
| 4,762,364 A | 8/1988 | Young |
| 4,915,446 A | 4/1990 | Darling et al. |

(Continued)

FOREIGN PATENT DOCUMENTS

EP    1 110 807    6/2001

(Continued)

OTHER PUBLICATIONS

International Search Report dated Apr. 5, 2007, French Application No. 0607707.

*Primary Examiner*—Laurie K Cranmer
(74) *Attorney, Agent, or Firm*—Barnes & Thornburg LLP (57) ABSTRACT

A child restraint includes a seat support and a juvenile seat mounted to swivel about an axis on the seat support. The seat support is adapted to set on a vehicle seat.

20 Claims, 11 Drawing Sheets

U.S. PATENT DOCUMENTS

| | | | | |
|---|---|---|---|---|
| 4,936,629 A * | 6/1990 | Young | ... | 297/256.12 |
| 4,971,392 A * | 11/1990 | Young | ... | 297/256.12 |
| 5,029,928 A | 7/1991 | Huber | | |
| 5,031,960 A | 7/1991 | Day | | |
| 5,498,052 A | 3/1996 | Severini et al. | | |
| 5,524,964 A | 6/1996 | Weimersheimer | | |
| 5,803,543 A | 9/1998 | Hartmann | | |
| 6,196,629 B1 | 3/2001 | Onishi et al. | | |
| 6,241,314 B1 | 6/2001 | Pufall | | |
| 6,322,142 B1 * | 11/2001 | Yoshida et al. | ... | 297/250.1 |
| 6,431,647 B2 * | 8/2002 | Yamazaki | ... | 297/256.12 |
| 6,505,887 B2 | 1/2003 | Hampton | | |
| 6,572,189 B1 * | 6/2003 | Blaymore | ... | 297/256.12 |
| 6,695,378 B2 | 2/2004 | Hanagan | | |
| 6,746,080 B2 * | 6/2004 | Tsugimatsu et al. | ... | 297/256.13 |
| 6,773,065 B1 * | 8/2004 | Stamper | ... | 297/256.12 |
| 7,073,859 B1 | 7/2006 | Wilson | | |
| 7,108,326 B2 | 9/2006 | Schurg | | |
| 7,163,265 B2 | 1/2007 | Adachi | | |
| 7,229,118 B2 | 6/2007 | Saberan et al. | | |
| 7,246,855 B2 | 7/2007 | Langmaid et al. | | |
| 7,270,371 B2 | 9/2007 | Adragna et al. | | |
| 7,344,192 B2 | 3/2008 | Kespohl | | |
| 7,357,451 B2 * | 4/2008 | Bendure et al. | ... | 297/256.12 |
| 7,374,245 B2 | 5/2008 | Tanaka et al. | | |
| 7,478,877 B2 * | 1/2009 | Lhomme et al. | ... | 297/256.12 |
| 7,481,492 B2 * | 1/2009 | Lhomme et al. | ... | 297/256.12 |
| 7,490,897 B2 * | 2/2009 | Lhomme et al. | ... | 297/256.12 |
| 7,490,898 B2 * | 2/2009 | Lhomme et al. | ... | 297/256.12 |
| 2005/0225139 A1 * | 10/2005 | Biaud | ... | 297/256.12 |
| 2006/0170262 A1 * | 8/2006 | Gold et al. | ... | 297/256.12 |

FOREIGN PATENT DOCUMENTS

| | | |
|---|---|---|
| EP | 1110807 | 6/2001 |
| EP | 1 247 688 | 10/2002 |
| EP | 1247688 | 10/2002 |
| EP | 1 625 967 | 2/2006 |
| EP | 1 625 968 | 2/2006 |
| EP | 1625967 | 2/2006 |
| EP | 1625968 | 2/2006 |
| WO | 2005/000627 | 1/2005 |
| WO | 2005000627 | 1/2005 |

* cited by examiner

CHILD RESTRAINT WITH SWIVELING JUVENILE SEAT HAVING A SEAT-ANCHOR GUIDE CHANNEL

This application claims priority under 35 U.S.C. §119(e) to U.S. Provisional Application Ser. No. 60/953,110, filed Jul. 31, 2007, which is expressly incorporated by reference herein.

BACKGROUND

The present disclosure relates to child restraints, and particularly to child restraints adapted to be anchored to a vehicle seat to transport a child in a vehicle. More particularly, the present disclosure relates to a child restraint including a swiveling juvenile seat.

SUMMARY

According to the present disclosure, a child restraint includes a base and a juvenile seat mounted on the base for swiveling motion about an axis of rotation. The juvenile seat includes a seat bottom mounted on a swivel coupled to the base and a seat back arranged to extend upwardly from the seat bottom.

In illustrative embodiments, the child restraint also includes a seat-back lock that is carried on the seat back and configured to include a hook designed to mate with a stationary seat anchor coupled to the base whenever the juvenile seat is swiveled relative to the base to assume a forward-facing travel position. The seat-back lock and the stationary seat anchor cooperate to define a seat stop configured to provide means for retaining the juvenile seat in the forward-facing travel position to block rotation of the juvenile seat about the axis of rotation.

The stationary seat anchor is fixed on the base and located to "move" in a seat-anchor guide channel formed in the seat back of the juvenile seat during swiveling motion of the juvenile seat relative to the base. The seat-anchor guide channel is configured to providing means for guiding the stationary seat anchor to mate with the hook of the seat-back lock to "cure" any "misalignment" of the seat-back lock and stationary seat anchor that may exist. In illustrative embodiments, the seat back is formed to include two seat-anchor guide channels.

In illustrative embodiments, the seat back is formed to include, in series, a first seat-anchor guide channel, a central opening exposing the seat-back lock, and a second seat-anchor guide channel. The hook included in the seat-back lock is arranged to extend through the central opening and to mate with the stationary seat anchor upon arrival of the swiveling juvenile seat at the forward-facing travel position. The first seat-anchor guide channel receives and guides the stationary seat anchor on the base during clockwise swiveling motion of the juvenile seat relative to the base from the left-facing entry position to the forward-facing travel position. The second seat-anchor guide channel receives and guides the stationary seat anchor on the base during counterclockwise swiveling motion of the juvenile seat relative to the base from the right-facing entry position to the forward-facing travel position.

In illustrative embodiments, a hook-release controller is coupled to each armrest included in the juvenile seat. The hook-release controller is configured to operate a companion linkage coupled to the hook so that a user can disengage the hook included in the seat-back lock from the stationary seat anchor whenever the operator desires to swivel the juvenile seat relative to the base from the forward-facing travel position to either a left-facing or right-facing entry position so that a child can be seated easily in the juvenile seat while the base of the child restraint is fixed in a stationary position on a vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an illustrative child restraint including a juvenile seat, a seat-back lock coupled to the juvenile seat, and a seat support including an "L-shaped" base and a swivel in accordance with the present disclosure and showing that the base of the child restraint is anchored to an underlying vehicle seat by a lap/shoulder belt system included in a vehicle and showing the juvenile seat after it has been rotated on the swivel about 90° in a "clockwise" direction (represented by a double arrow) about a vertical axis relative to an underlying swivel-mount pad included in the base to lie in a "left-facing" entry position relative to the vehicle seat and showing a stationary seat anchor including a U-shaped anchor rail coupled to a top portion of an anchor-support pad that is included in the base;

FIG. 4-1 is a diagrammatic view of the child restraint of FIG. 1 showing the juvenile seat oriented to lie in the left-facing entry position relative to the base of the seat support and the U-shaped anchor rail of the seat anchor coupled to an upright anchor-support pad included in the base and showing that the juvenile seat is mounted on a swivel for swiveling motion on an arc relative to the base;

FIG. 4-2 is a diagrammatic view of the child restraint of FIG. 2 showing the juvenile seat oriented to lie in the forward-facing travel position and suggesting that the juvenile seat rotated about the swivel (1) in a counterclockwise direction along a first portion of the arc from the left-facing entry position of FIG. 4-1 to reach the forward-facing travel position and (2) in a clockwise direction about a second portion of the arc from the right-facing entry position of FIG. 4-3 to reach the forward-facing travel position;

FIG. 4-3 is a diagrammatic view of the child restraint of FIG. 3 showing the juvenile seat oriented to lie in the right-facing entry position;

FIGS. 5-7 are partial rear elevation views of the juvenile seat of FIGS. 1-4 showing (in a diagrammatic manner) "swiveling motion" of the juvenile seat relative to the U-shaped anchor rail included in the stationary seat anchor coupled to the L-shaped base to cause the seat-back lock located in a central opening formed in a center portion of the seat back of the juvenile seat to reach and mate with the stationary U-shaped anchor rail to block further swiveling motion of the juvenile seat relative to the base;

FIG. 8 is an enlarged exploded perspective view of components included in an illustrative seat-back lock along with an illustration of a diagrammatic representation of a portion of the seat back of the juvenile seat showing that the seat-back lock (when assembled) extends through a central opening formed in the seat back and located between and in communication with left and right seat-anchor guide channels formed in the seat back and showing that (1) the seat-back lock includes a spring-loaded "wide" hook located between two relatively "narrow" spaced-apart spring-loaded hook-retainer latches and configured to include an upstanding finger sized to extend into a finger-receiving opening formed in the U-shaped anchor rail and that (2) downwardly projecting tips of the two hook-retainer latches are configured to engage companion flange plates included in the hook on opposite sides of the finger to retain the hook normally in an "unlocked" position as shown, for example, in FIG. 10;

FIGS. 10-12 are sectional views similar to FIG. 9 showing, in sequence, three positions of the spring-loaded hook included in the seat-back lock coupled to the juvenile seat;

FIG. 12 is a sectional view similar to FIGS. 10 and 11 and taken along line 12-12 of FIG. 2 showing the hook after it has been pivoted by its spring to assume a "locked" position passing an upstanding finger included in the hook through a finger-receiving opening defined by the U-shaped anchor rail and trapping a center bar included in the U-shaped anchor rail of the stationary seat anchor between the finger of the hook and the rear portion of the juvenile seat to block further swiveling motion of the juvenile seat relative to the base and showing that pivoting movement of the hook caused a top edge of the finger included in the hook to contact the underside of a horizontally extending lift tab included in the flag lifter of the swivel-status indicator and then raise the signal flag carried on the flag lifter upwardly in an internal channel formed in the base to a visible position above the base to notify observers of the child restraint that the seat-back lock has been mated with the stationary seat anchor so that further swiveling motion of the juvenile seat is blocked;

DETAILED DESCRIPTION

A child restraint 10 in accordance with the present disclosure includes a seat support 11 and a rotatable juvenile seat 14 mounted on seat support 11. Seat support 11 includes a base 12 and a swivel system 16 comprising a swivel 46 and a swivel-direction controller 48. Swivel system 16 is coupled to base 12 and juvenile seat 14 and configured to support juvenile seat 14 for swiveling motion about a vertical axis 18 between, for example, a "left-facing" entry position shown in FIGS. 1 and 4-1, a "forward-facing" travel position shown in FIGS. 2 and 4-2, and a "right-facing" entry position shown in FIGS. 3 and 4-3. Swivel-direction controller 48 is coupled to base 12 as suggested in FIGS. 1-3.

Child restraint 10 also includes a seat stop 17 shown, for example, in FIGS. 4-6 and 7. Seat stop 17 is configured to provide means for selectively retaining juvenile seat 14 in the forward-facing travel position shown in FIGS. 2 and 7 to block rotation of juvenile seat 14 about axis of rotation 18 toward the left-facing entry position shown in FIG. 1 and toward the right-facing entry position shown in FIG. 3.

Figures 1, 2, 3:
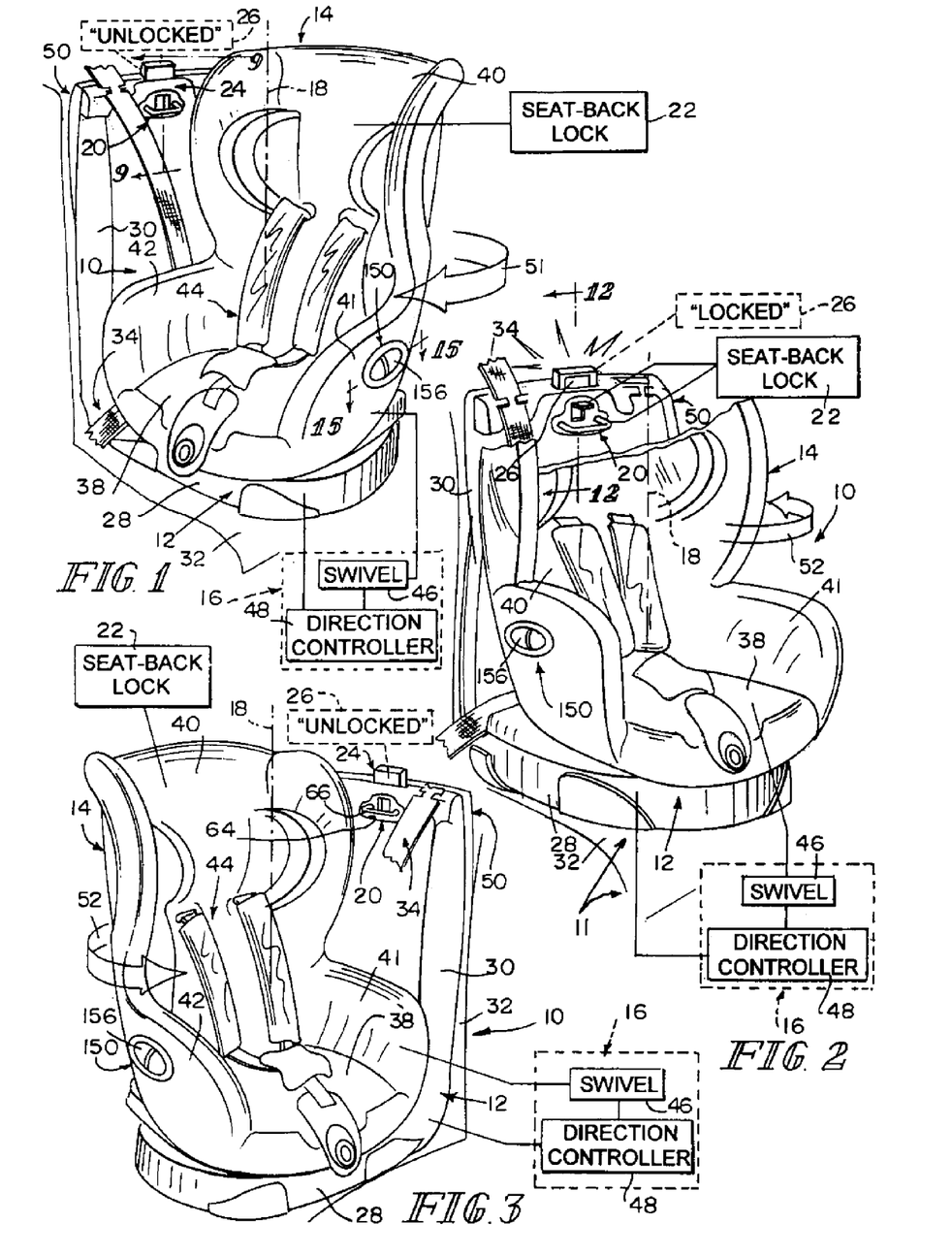
FIG. 2 is a view similar to FIG. 1 showing the juvenile seat after it has been rotated on the swivel about 90° in a "counterclockwise" direction (represented by a double arrow) about the vertical axis to assume a "forward-facing" travel position relative to the vehicle seat.
FIG. 3 is a view similar to FIGS. 1 and 2 showing the juvenile vehicle seat after it has been unlocked and rotated on the swivel about another 90° in the counterclockwise direction (represented by a double arrow) about the vertical axis to assume a "right-facing" entry position relative to the vehicle seat.
Figure 4:
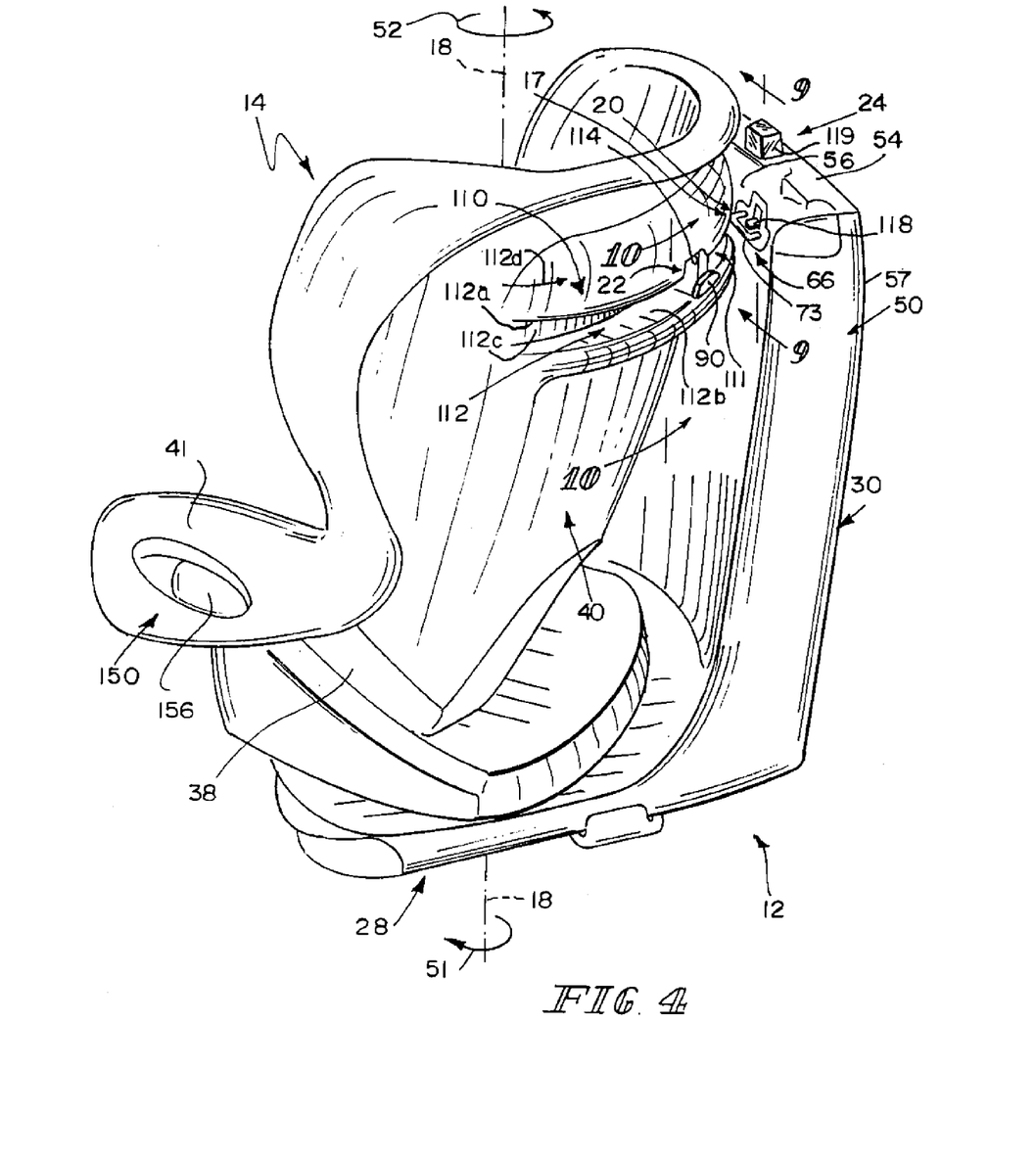
FIG. 4 is an enlarged perspective view of the child restraint showing a hook included in the seat-back lock extending through a central opening formed in the seat back and located between two seat-anchor guide channels also formed in the seat back and showing the juvenile seat as it is being rotated in a counterclockwise direction from the left-facing entry position of FIG. 1 toward the forward-facing travel position of FIG. 2 along with a U-shaped anchor rail included in the stationary seat anchor coupled to the base and configured to mate with the hook included in the seat-back lock as suggested in FIG. 7.
Figure 5:
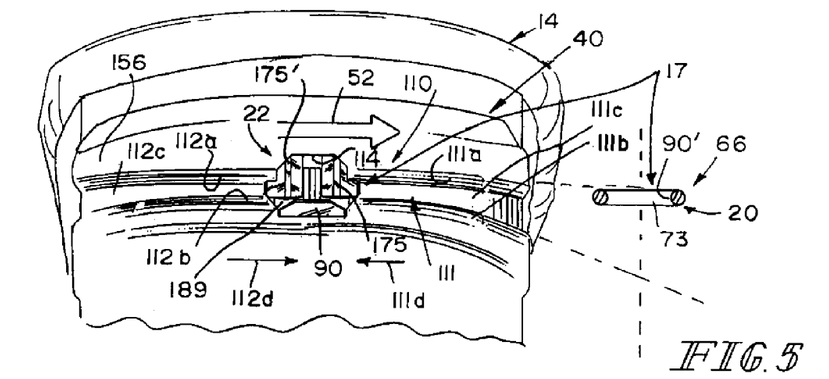
FIG. 5 is a rear elevation view of a portion of the top of the seat back included in the juvenile seat of FIG. 4 showing an illustrative seat-back lock exposed in a central opening formed in the seat back of the juvenile seat and located between a "funnel-shaped" first seat-anchor guide channel formed in the right side of the rear portion of the seat back and a funnel-shaped second seat-anchor guide channel formed in a left side of the rear portion of the seat back and showing the U-shaped anchor rail of the seat anchor located outside of the funnel-shaped first seat-anchor guide channel.
Figure 6:
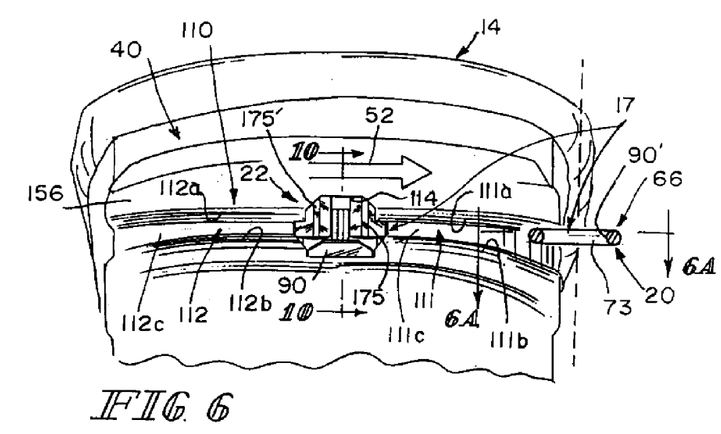
FIG. 6 is a view similar to FIG. 5 showing further "counterclockwise" movement of the seat back relative to the base to locate the U-shaped anchor rail of the stationary seat anchor at a "wide" outer mouth of the funnel-shaped first seat-anchor guide channel.
Figures 9, 10:
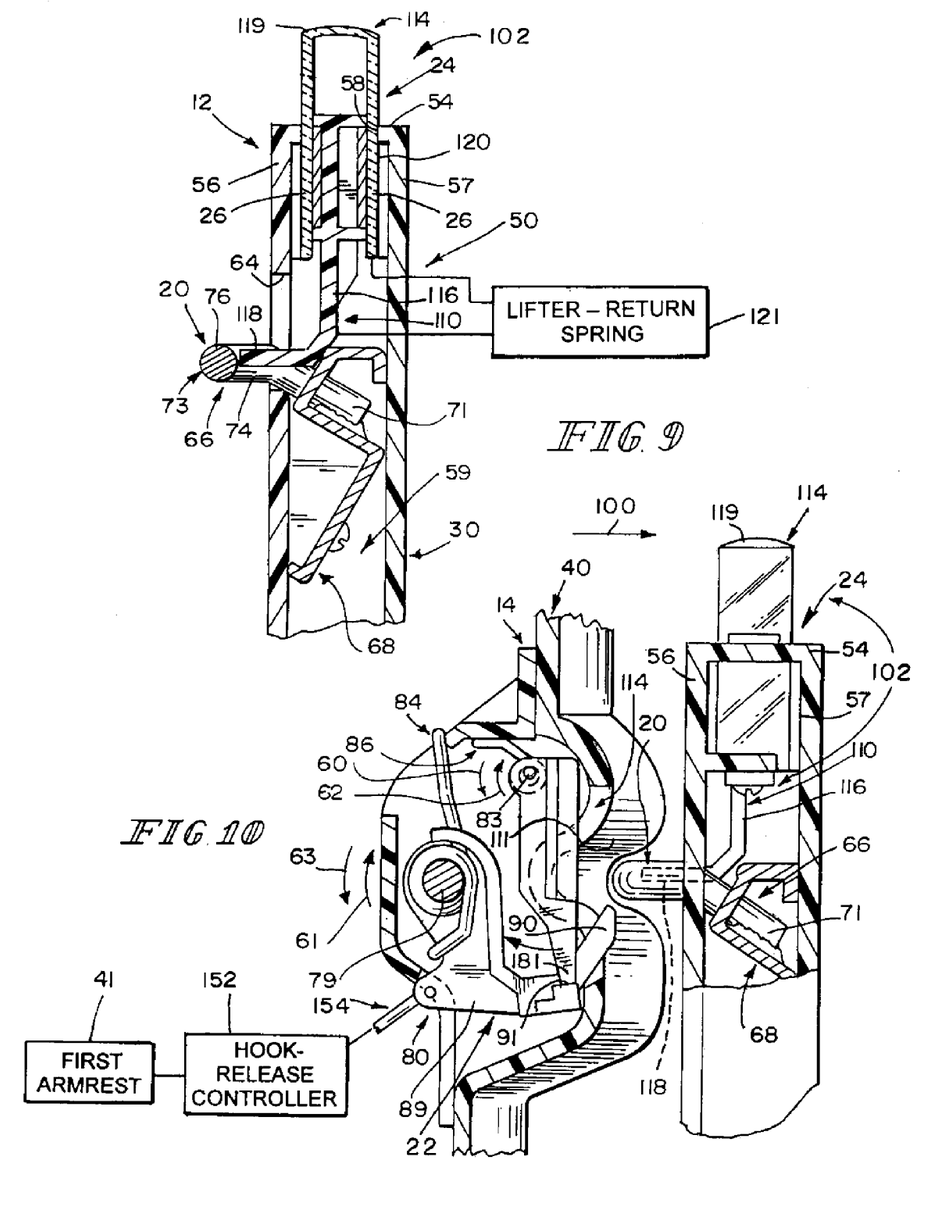
FIG. 9 is an enlarged sectional view taken along line 9-9 of FIGS. 1 and 4 showing the stationary seat anchor coupled to the upright anchor-support pad included in the L-shaped base and showing the signal flag of a swivel-status indicator included in the child restraint in a hidden (e.g. not-visible) position in a cavity formed in the anchor-support pad of the base.
FIG. 10 is a sectional view similar to FIG. 9 and taken along line 10-10 of FIG. 6 showing the hook retained in an "unlocked" position away from the U-shaped anchor rail of the stationary seat anchor by a downwardly extending spring-loaded hook-retainer latch as the juvenile seat rotates in a "counterclockwise" direction and before the rotating juvenile seat arrives at the forward-facing travel position shown in FIGS. 2, 7, 12, and 13.

Seat stop 17 of child restraint 10 includes a stationary seat anchor 20 coupled to base 12 as suggested in FIGS. 1, 4, and 9 and a seat-back lock 22 coupled to juvenile seat 14 as suggested in FIGS. 6 and 10. Stationary seat anchor 20 includes an exposed U-shaped anchor rail 73 as shown in FIGS. 1-5. Seat-back lock 22 is configured to mate with U-shaped anchor rail 73 of seat anchor 20 to block swiveling motion of juvenile seat 14 as suggested in FIGS. 5-7 and 10-12.

Juvenile seat 14 includes a seat bottom 38 coupled to swivel system 16 and a seat back 40 associated with seat bottom 38 as suggested in FIGS. 1-4. As shown, for example, in FIGS. 6-8 and 13, seat back 40 is formed to include first and second seat-anchor guide channels 111, 112 and a central opening 114. Central opening 114 is arranged to lie between first and second seat-anchor guide channels 111, 112 as shown, for example, in FIG. 8. First and second seat-anchor guide channels 111, 112 interconnect central opening 114 as shown, for example, in FIG. 8.

Figure 8:
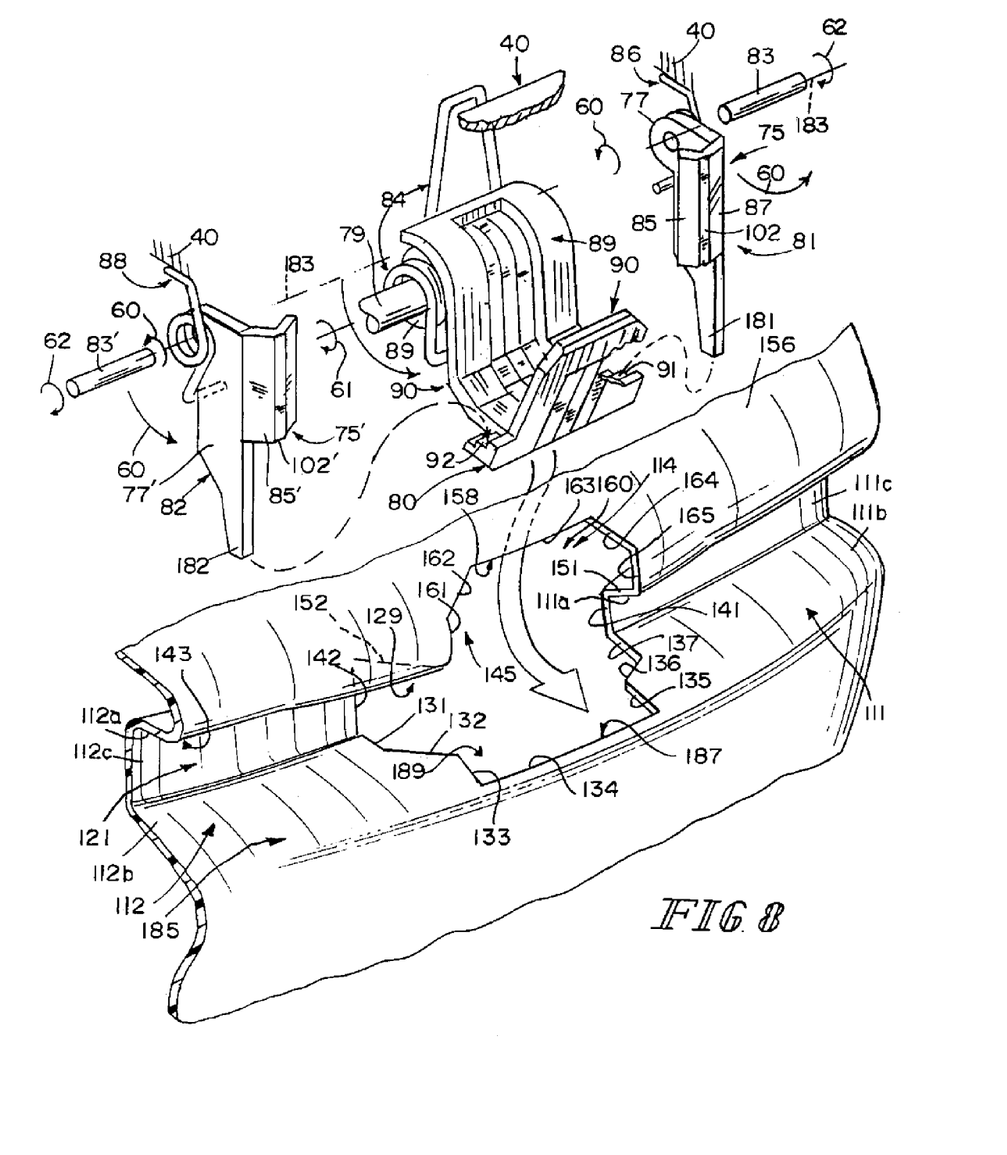

Seat-back lock 22 is arranged to extend through central opening 114 as suggested in FIG. 8 to assume a mounted position shown in FIGS. 4-8 and 13. Seat-back lock 22 is arranged to mate with stationary seat anchor 20 upon arrival of juvenile seat 14 at the forward-facing travel position.

Figures 11, 12:
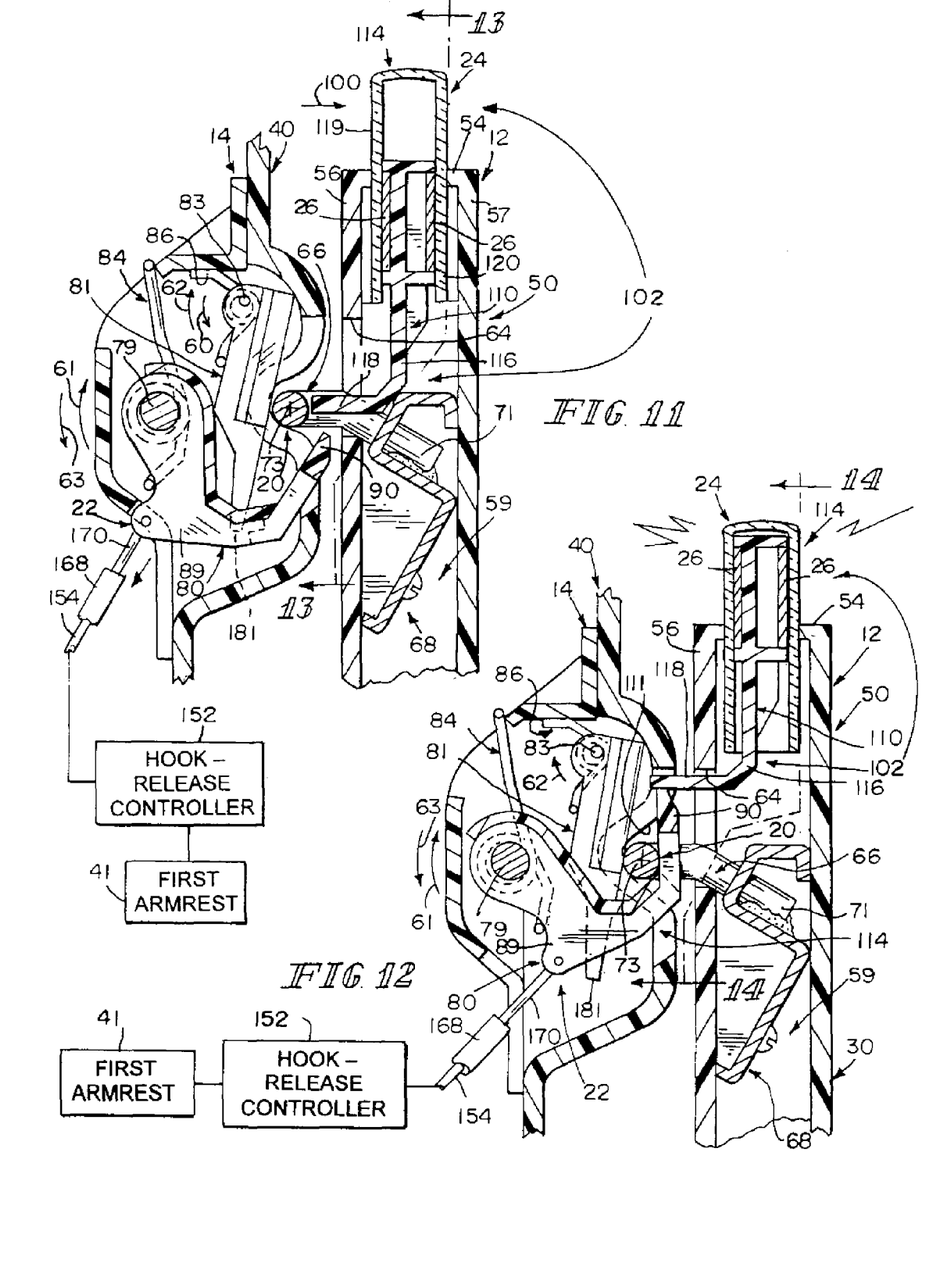
FIG. 11 is a sectional view similar to FIG. 10 just as the rotating juvenile seat arrives at the forward-facing travel position to cause the spring-loaded hook-retainer latches (one of which is shown here) to be pivoted in a clockwise direction in response to engagement of the moving hook-retainer latches with the U-shaped anchor rail of the stationary seat anchor so as to disengage the spring-loaded hook, allowing the hook to be pivoted by its spring in a counterclockwise direction toward the U-shaped anchor rail of the stationary seat anchor.

A swivel-status indicator 24 included in child restraint 10 cooperates with seat-back lock 22 as suggested, for example, in FIGS. 10-12 to raise a signal flag 26 included in swivel-status indicator 24 to a visible position above base 12 as shown in FIG. 12 as soon as juvenile seat 14 arrives at the forward-facing travel position shown in FIG. 2. Such a "raised" signal flag 26 provides notice to an observer that seat-back lock 22 has mated with stationary seat anchor 20 upon arrival of juvenile seat 14 at the forward-facing travel position as shown in FIG. 2 to block swiveling motion of juvenile seat 14 about vertical axis 18 relative to base 12.

Base 12 is L-shaped in an illustrative embodiment as suggested in FIGS. 1 and 4. Base 12 includes a horizontally extending swivel-mount pad 28 arranged to underlie juvenile seat 14 and an upright anchor-support pad 30 arranged to extend upwardly from a rear edge of swivel-mount pad 28. Seat anchor 20 and swivel-status indicator 24 are coupled to a top portion 50 of upright anchor-support pad 30 as suggested in FIGS. 1-4. Base 12 is adapted to be anchored to a vehicle seat 32 using any suitable means such as a lap-and-shoulder belt restraint harness 34 associated with vehicle seat 32.

Juvenile seat 14 includes a seat bottom 38, a seat back 40 extending upwardly from a rear portion of seat bottom 38, and first and second armrests 41, 42 coupled to seat bottom 38 and seat back 40 as shown, for example, in FIG. 1. Juvenile seat 14 also includes a restraint harness 44 coupled to seat bottom 38 and seat back 40 or any other suitable juvenile restraint means.

Swivel system 16 includes a swivel 46 and a swivel-direction controller 48 as shown diagrammatically in FIGS. 1-3. Swivel 46 is coupled to swivel-mount pad 28 of base 12 and to seat bottom 38 of juvenile seat 14 and is a device joining two parts so that one or both can pivot freely (as on a bolt or pin). Swivel-direction controller 48 is configured to provide means cooperating with swivel 46 for allowing juvenile seat 14 to rotate about vertical axis 18 in only one direction (selected by a caregiver) at a time. Thus, a caregiver can operate swivel-direction controller 48 to allow juvenile seat 14 to rotate about vertical axis 18 from the forward-facing travel position shown in FIG. 2 in either (1) a clockwise direction 51 to assume the left-facing entry position shown in FIG. 1 or (2) a counterclockwise direction 52 to assume the right-facing entry position shown in FIG. 3.

Seat anchor 20 is coupled to top portion 50 of upright anchor-support pad 30 of base 12 to lie in a stationary position on base 12 as shown, for example, in FIGS. 4 and 9. Top portion 50 is formed to include a top wall 54 and front and back walls 56, 57 depending from top wall 54 as shown in FIG. 9. Top wall 54 is formed to include a flag aperture 58 opening into an interior channel 59 formed between front and back walls 56, 57. Front wall 56 is arranged to face toward seat back 40 of juvenile seat 14 when juvenile seat 14 lies in the forward-facing travel position as shown in FIG. 12. Front wall 56 is formed to include an open window 64 associated with stationary seat anchor 20 and swivel-status indicator 24 as shown in FIGS. 3, 4, and 9.

Seat anchor 20 includes an anchor bar 66 and a bar foundation 68 as shown in FIG. 9. Anchor bar 66 is arranged to project from interior channel 59 outwardly through open window 64 formed in front wall 56 so that anchor bar 66 can mate with seat-back lock 22 when juvenile seat 14 is moved to assume the forward-facing travel position as suggested in FIGS. 7 and 12. Bar foundation 68 is mounted in a stationary position, for example, in a region of interior channel 59 near open window 64 as suggested in FIG. 9. In an illustrative embodiment, bar foundation 68 is made of a rigid material such as steel.

As suggested in FIG. 9, anchor bar 66 has a first leg 71 coupled to bar foundation 68, a second leg 72 arranged to lie in spaced-apart relation to first leg 71 and coupled to bar foundation 68, and a U-shaped anchor rail 73 arranged to interconnect "free" ends of first and second legs 71, 72 and lie generally outside of interior channel 58. U-shaped anchor rail 73 includes a short first segment 74 coupled to first leg 71, a short second segment 75 coupled to second leg 72, and a relatively longer third segment 76 arranged to interconnect "free" ends of first and second segments 74, 75 as suggested in FIGS. 6A and 9. Seat-back lock 22 is configured to mate with third segment 76 of U-shaped anchor rail 73 of anchor bar 66 as suggested in FIG. 12 to retain juvenile seat 14 in the forward-facing travel position relative to base 12.

Seat-back lock 22 is shown, for example, in FIGS. 8 and 10-12. Seat-back lock 22 includes a hook 80 mounted for pivotable movement about a horizontal axis 179 on a pivot shaft 79 coupled to seat back 40, a first hook-retainer latch 81 mounted for pivotable movement about another horizontal axis 183 on a pivot shaft 83 coupled to seat back 40, and a second hook-retainer latch 82 mounted for pivotable movement about horizontal axis 183 on pivot shaft 83' (or a pivot shaft 83) independent of pivotable first hook-retainer latch 82. Seat-back lock 22 also includes a hook-return spring 84 coupled to hook 80 and seat back 40, a first latch-return spring 86 coupled to first hook-retainer latch 81 and seat back 14, and a second latch-return spring 88 coupled to second hook-retainer latch 82 and seat back 40 as suggested in FIGS. 5 and 10. In the illustrated embodiment, each of springs 84, 86, and 88 is a torsion spring.

Hook 80 includes an axle mount 89 coupled to pivot shaft 79, an upstanding finger 90 cantilevered to axle mount 89, a first flange plate 91 coupled to one side of axle mount 89, and a second flange plate 92 coupled to another side of axle mount 89 as shown, for example, in FIG. 8. Finger 90 is arranged to lie between first and second flange plates 91, 92 as shown, for example, in FIG. 8.

Figure 13:
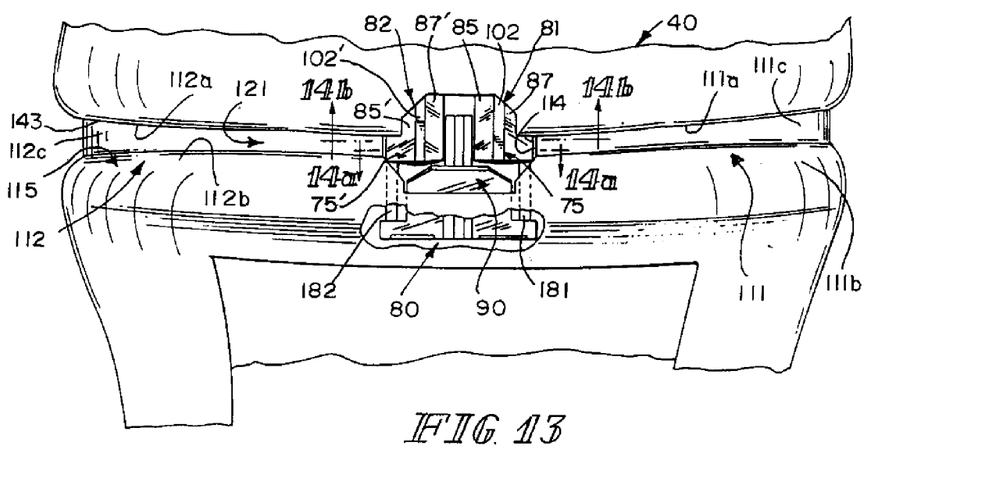
FIG. 13 is an enlarged rear elevation view of a portion of the child restraint shown in FIG. 4 showing portions of the seat-back lock of FIG. 8 visible in a central opening formed in the seat back of the juvenile seat in a location between the first (right) and second (left) anchor-guide channels also formed in the seat back, with a portion of the seat back broken away to show engagement of a tip of each of the laterally spaced-apart first and second hook-retainer latches with the hook included in the seat-back lock to "maintain" the hook in an unlocked position in the central opening.

Hook 80 is mounted for movement on pivot shaft 79 relative to seat back 40 between an "unlocked" position shown, for example, in FIGS. 10 and 13 and a "locked" position shown, for example, in FIG. 12. In the unlocked position, hook 80 is disengaged from U-shaped anchor rail 73 of anchor bar 66 of stationary seat anchor 20 as suggested in FIG. 10 to allow swiveling motion of juvenile seat 14 about vertical axis 18 relative to base 12. In the locked position, hook 80 cooperates with seat back 40 of juvenile seat 14 to mate with the relatively longer third segment 76 of U-shaped anchor rail 73 of anchor bar 66 of stationary seat anchor 20 as suggested in FIG. 10 when juvenile seat 14 is moved to assume the forward-facing travel position as shown, for example, in FIG. 12. In the illustrated embodiment, in the locked position, upstanding finger 90 of hook 80 extends upwardly into a finger-receiving opening 90g defined by U-shaped anchor rail 73 and provided between U-shaped anchor rail 73 and front wall 56 of upper portion 50 of anchor-support pad 30 of L-shaped base 12 as suggested in FIGS. 7 and 12.

As also shown in FIG. 8, first hook-retainer latch 81 includes an axle mount 77 coupled to pivot shaft 83 and configured to terminate at a downwardly extending tip 181 and a pivot actuator 175 coupled to axle mount 77. Pivot actuator 175 is "roof-shaped" in an illustrative embodiment and includes a left-side cam surface 85, a right-side cam surface 87 coupled to axle mount 77, and a ridge 102 arranged to interconnect left-side and right-side cam surfaces 85 and 87. Left-side and right-side cam surfaces 85, 87 are joined by a raised and flattened ridge 102. When viewed from above in FIG. 8, left-side cam surface 85 has a "negative" slope, right-side cam surface 87 has a "positive" slope, and flattened ridge 102 has no slope. Similarly, second hook-retainer latch 82 includes an axle mount 77' coupled to pivot shaft 83' and configured to terminate at downwardly extending tip 182 and a pivot actuator 175' coupled to axle mount 77'. Pivot actuator 175' includes left-side and right-side cam surfaces 85' and 87' and raised ridge 102'. When viewed from above (in FIG. 8), left-side cam surface 85' has a negative slope, right-side cam surface 87' has a positive slope, and flattened ridge 102' has no slope.

Seat back 40 of juvenile seat 14 is formed to include guide means 110 for guiding U-shaped anchor rail 73 of stationary seat anchor 20 to engage seat-back lock 22 mounted in seat back 40 during rotating movement of juvenile seat 14 about vertical axis 18 relative to base 12 from either the left- or right-facing entry positions of FIGS. 1 and 3, respectively, to the forward-facing travel position of FIG. 2. In an illustrative embodiment, guide means 110 includes a first seat-anchor guide channel 111 formed in the right side of the rear portion of seat back 40 to communicate with a central opening 114 formed in seat back 40 to expose seat-back lock 22 as shown in FIGS. 4-8 and 13. Guide means 110 also includes a second seat-anchor guide channel 112 formed in the left side of the rear portion of seat back 40 also to communicate with central opening 114 as shown in FIGS. 4-8 and 13.

As suggested in FIGS. 5-8 and 13, seat-back lock 22 is exposed in the central opening 114 that is formed in seat back 40 and arranged to lie between seat-anchor guide channels 111 and 112. In an illustrative embodiment, first seat-anchor guide channel 111 is funnel-shaped and defined by first upper and lower guide walls 111a and 111b converging in a direction 111d extending toward central opening 114 and a first rear wall 111c interconnecting guide walls 111a and 111b as suggested in FIGS. 8 and 13. First seat anchor guide channel 111 provides means for guiding U-shaped anchor rail 73 of stationary seat anchor 20 to mate with finger 90 of hook 80 as juvenile seat 14 rotates in counterclockwise direction 52 relative to base 12 as suggested in FIGS. 5-7 and 10-12. Similarly, second seat-anchor guide channel 112 is funnel-shaped and defined by second upper and lower guide walls 112a and 112b converging in a direction 112d extending toward central opening 114 and a second rear wall 112c interconnecting guide walls 112a and 112b as suggested in FIGS. 8 and 13. Second seat-anchor guide channel 112 provides means for guiding U-shaped anchor rail 73 of stationary seat anchor 20 to mate with finger 90 of hook 80 as juvenile seat 14 rotates in clockwise direction 51 relative to base 12.

As suggested in FIGS. 8 and 13, first and second lower guide walls 111b, 112b cooperate to define a somewhat V-shaped lower surface 115. This lower surface 185 is formed to include a first opening 189 that is part of central opening 114. Lower surface 185 includes an interior edge 187 defining a border of first opening 189. Interior edge 187 includes, in series, first segment 131, second segment 132, third segment 133, fourth segment 134, fifth segment 135, sixth segment 136, and seventh segment 137. First and seventh segments 131, 137 are aligned in spaced-apart parallel relation to one another. Third and fifth segments 133, 135 are aligned in spaced-apart parallel relation to one another.

As suggested in FIGS. 8 and 13, first and second rear walls 11c, 112c cooperate to define a somewhat "bowtie-shaped" rear surface 121. This rear surface is formed to include a second opening 129 that is also part of central opening 114. Rear surface 121 includes a pair of spaced-apart parallel edges 141, 142 defining a partial border of second opening 129 as shown in FIG. 8.

As suggested in FIGS. 8 and 13, first and second upper guide walls 111a, 112a cooperate to define a somewhat V-shaped upper surface 143. This upper surface 143 is formed to include a third opening 145 that is also part of central opening 114. Upper surface 143 includes a pair of spaced-apart parallel edges 151, 152 defining a partial border of third opening 145 as suggested in FIG. 8.

As suggested in FIGS. 8 and 13, a top surface 156 of seat back 40 merges with upper surface 143. Top surface 156 is formed to include a fourth opening 158 that is also part of central opening 114. This top surface 156 includes an interior edge 160 defining a border of fourth opening 158. Interior edge 160 includes, in series, first segment 161, second segment 162, third segment 163, fourth segment 164, and fifth segment 165. First and fifth segments 161, 165 are aligned in spaced-apart parallel relation to one another.

Figures 6A, 7:
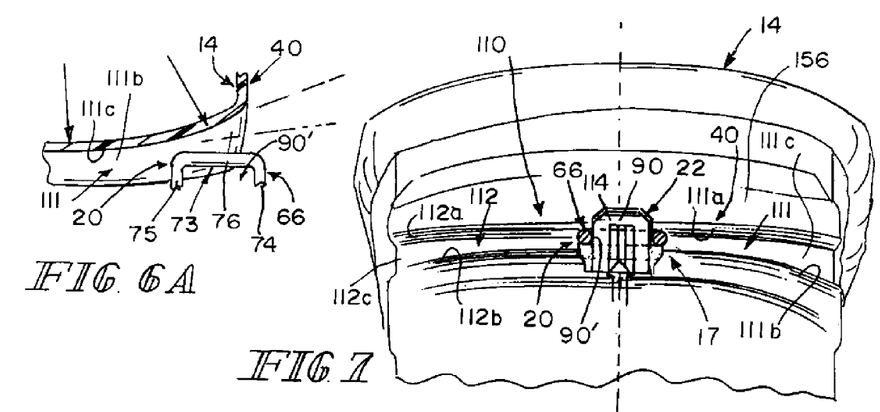
FIG. 6A is a sectional view taken along line 6A-6A of FIG. 6 showing a "horizontal" lead-in of the U-shaped anchor rail of the stationary seat anchor into the wide outer mouth of the moving funnel-shaped first seat-anchor guide channel.
FIG. 7 is a view similar to FIGS. 5 and 6 showing the result of continued "counterclockwise" movement of the seat back relative to the base to cause the U-shaped anchor rail of the stationary seat anchor on the anchor-support pad of the base to mate with the seat-back lock on the seat back once an upstanding finger included in the hook of the seat-back lock extends into a finger-receiving opening formed in the U-shaped anchor rail to lock the juvenile seat in the forward-facing travel position shown in FIG. 2.

Finger 90 of hook 80 of seat-back lock 22 is arranged to extend upwardly through first opening 119 formed in lower surface 115 of seat back 40 as shown in FIGS. 4-6 when hook 80 is located in the unlocked position shown, for example, in FIG. 10. As shown in FIG. 7, finger 90 of hook 80 is arranged to extend upwardly into fourth opening 158 formed in top surface 156 of seat back 40 when hook 80 is located in the locked position shown, for example, in FIG. 12.

Figures 14A, 14B:
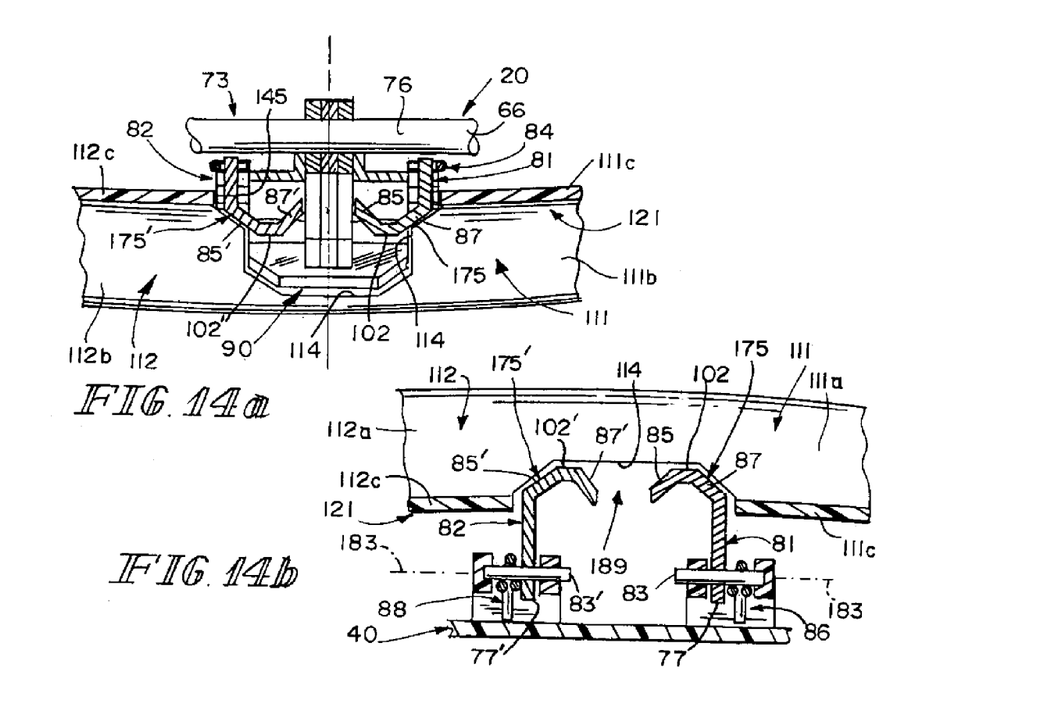
FIG. 14*a* is an enlarged transverse sectional view taken along line 14*a*-14*a* of FIG. 13.
FIG. 14*b* is an enlarged transverse sectional view taken along line 14*b*-14*b* of FIG. 13.

Pivot anchor 175 of first hook-retainer latch 81 and pivot anchor 175' of second hook-retainer latch 82 extend through second opening 129 formed in rear wall 121 as shown in FIG. 14a when hook 80 is located in the unlocked position shown, for example, in FIG. 10. Pivot anchors 175, 175' also extend into first and third openings 189, 145 when hook 80 is located in the unlocked position shown in FIG. 10. When finger 90 of hook 80 mates with U-shaped anchor rail 73 of seat anchor 20 to establish the locked position of hook 80 shown in FIG. 10, then third segment 76 of U-shaped anchor rail 76 urges pivot anchors 175, 175' away from anchor-support pad 30 of base 12 and out of first, second, and third openings 189, 129, 145 formed in seat back 40 as suggested in FIG. 7. At the same time, finger 90 extends upwardly into fourth opening 160 as also suggested in FIG. 7. In an illustrative embodiment, the shape of an exterior edge of finger 90 matches the shape of interior edge 160 in top surface 156 of seat back 40 as shown, for example, in FIG. 7.

An illustrative process for mating seat-back lock 22 to stationary seat anchor 20 is shown in a sequence illustrated in FIGS. 5-7 and 10-12. Seat-back lock 22 cooperates with stationary seat anchor 20 to define seat stop 17 as suggested in FIGS. 4-8.

Seat-back lock 22 mates with stationary seat anchor 20 normally whenever juvenile seat 14 is rotated about vertical axis 18 either (1) along a first portion "$S_1$" of the arc "S" from the left-facing entry position shown in FIGS. 1 and 4-1 in counterclockwise direction 52 to arrive at the forward-facing travel position shown in FIGS. 2 and 4-2 or (2) along a second portion "$S_2$" of the arc "S" from the right-facing entry position shown in FIGS. 3 and 4-3 in clockwise direction 51 to arrive at the forward-facing travel position shown in FIGS. 2 and 4-2. If, owing to an unexpected event, such mating does not take place in response to rotation of juvenile seat 14, seat-back lock 22 will mate with stationary seat anchor 20 in response to movement of seat back 40 in a generally rearward direction 100 (see FIGS. 10 and 11) toward upper portion 50 of anchor support 30 of L-shaped base 12 owing to elasticity of juvenile seat 14 and/or to external force loads applied in direction 100 to juvenile seat 14.

Hook 80 is shown in an "unlocked" position in FIGS. 6 and 10. First latch-return spring 86 provides means for yieldably urging first hook-retainer latch 81 to rotate in a counterclockwise direction 60 to cause a tip 181 of first hook-retainer latch 81 to engage first flange plate 91 of hook 80 to urge hook 80 to rotate in a clockwise direction 61 (against a torsional biasing force applied by hook-return spring 84) to assume the unlocked position shown in FIGS. 10 and 13. Similarly, second latch-return spring 88 provides means for yieldably urging second hook-retainer latch 82 to rotate in counterclockwise direction 60 (see FIG. 8) to cause a tip 182 of second hook-retainer latch 92 to engage second flange plate 92 of hook 80 to urge hook 80 to rotate in a clockwise direction 61 (against the torsional biasing force applied by hook-return spring 84). Hook 80 will stay in the unlocked position as long as one or both of spring-loaded first and second hook-retainer latches 81, 82 engage the first and second flange plates 91 to hold hook 80 in the unlocked position as suggested in FIGS. 10 and 13.

U-shaped anchor rail 73 of anchor bar 66 is arranged to engage both of spring-loaded first and second hook-retainer latches 81, 82 (one after the other) as juvenile seat 14 rotates about vertical axis (either in clockwise direction 51 or counterclockwise direction 52 and arrives at the forward-facing travel position. When juvenile seat 14 rotates in clockwise direction 51, U-shaped anchor rail 73 will engage, in sequence, left-side cam surface 85' on second hook-retainer latch 82 and then left-side cam surface 85 on first hook-retainer latch 81. When juvenile seat 14 rotates in counterclockwise direction 52, U-shaped anchor rail 73 will engage, in sequence, right-side cam surface 87 on first hook-retainer latch 81 and then right-side cam surface 87' on second hook-retainer latch 82.

Engagement of U-shaped anchor rail 73 and hook-retainer latches 81, 82 causes both hook-retainer latches 81, 82 to (1) rotate in counterclockwise direction 62 against the torsional biasing force applied by companion latch-return springs 86, 88 and (2) disengage flange plates 91, 92 of hook 80 as suggested in FIG. 11. This "plate-disengagement" action releases hook 80 to allow hook-return spring 84 to urge hook 80 to rotate in counterclockwise direction 63 to assume the locked position shown in FIG. 12. In the locked position, upstanding finger 90 of hook 80 passes through finger-receiving opening 90' as suggested in FIG. 7 and mates with the relatively longer segment 76 of U-shaped anchor rail 73 of anchor bar 66 as suggested in FIG. 12 to establish mating engagement of seat-back lock 22 and seat anchor 20 to block further swiveling motion of juvenile seat 14 about vertical axis 18 relative to L-shaped base 12.

Swivel-status indicator 24 includes a signal unit 102 comprising a signal flag 26 and a flag lifter 110 coupled to signal flag 26, at least one lifter-return springs 121, and a flag-viewing shell 114 as shown, for example, in FIGS. 9-12. Signal unit 102 is mounted for movement relative to base 12 between a first position representing an "unlocked" (swiveling) condition of juvenile seat 14 as shown, for example, in FIG. 9 and a second position representing a "locked" (non-swivel) condition of juvenile seat 14 as shown, for example, in FIG. 12.

Flag lifter 110 includes a vertically extending flag support 116 and a horizontally extending lift tab 118 coupled to a lower end of flag support 116 as shown best in FIG. 9. Flag support 16 is mounted for up-and-down movement in internal channel 59 of top portion 50 of anchor-support pad 30 of base 12. Lift tab 118 is coupled to flag-support 116 for up-and-down movement in open window 64 of front wall 56 of top portion 50 in response to up-and-down movement of flag support 116 in internal channel 59. In an illustrative embodiment, one signal flag 26 is carried on a front face of flag support 116 and another signal flag 26 is carried on a back face of flag support 116.

Flag-viewing shell 114 is made of a transparent material and includes a frame 120 mounted in a stationary position in internal channel 59 of top portion 50 and a dome 119 coupled to frame 120 and arranged to extend through flag aperture 58 formed in top wall 54 of top portion 50. Dome 119 of flag-viewing shell 114 rises above top portion 50 of base 12 as shown, for example, in FIG. 9.

Lifter-return spring 121 acts between, for example, a portion of shell 114 and a portion of flag lifter 10 as suggested diagrammatically in FIG. 9. Lifter-return spring 121 is a coiled compression spring in an illustrative embodiment. Normally, lifter-return spring 121 provides means for yieldably urging flag lifter 110 downwardly to assume a lowered position in internal channel 59 as shown in FIG. 9. In this lowered position, signal flags 26 are located in a "not-visible" position inside base 12.

Finger 90 of hook 80 moves to engage the underside of lift tab 118 of flag lifter 110 and move flag lifter 110 upwardly to a raised position in internal channel 59 as shown in FIGS. 8 and 10 whenever juvenile seat 14 is rotated about vertical axis 18 to assume the forward-facing travel position. Upward movement of flag lifter 110 raises signal flags 127 to a "visible" position above base 12 and inside dome 119 of flag-viewing shell 114 as shown in FIGS. 12 and 14.

A hook mover system 150 is provided as suggested in FIGS. 10-12 for affirmatively withdrawing finger 90 of hook 80 from finger-receiving opening 90' in U-shaped anchor rail 73 (at the option of a caregiver) and returning hook 80 to the unlocked position shown in FIG. 10. In an illustrative embodiment, hook mover system 150 includes a hook-release controller 153 coupled to each armrest 41, 42 and a separate linkage 154 coupling each hook-release controller 153 to hook 80 as suggested diagrammatically in FIG. 14 and in FIGS. 10-12.

Figure 15:
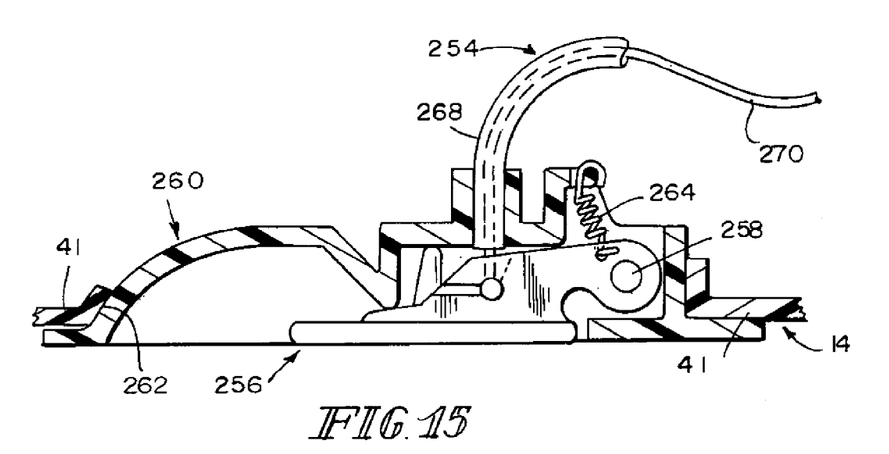
FIG. 15 is an enlarged sectional view taken along line 15-15 of FIG. 1 showing an actuator lever included in a hook-release controller associated with the seat-back lock and coupled to an armrest included in the juvenile seat.
Figure 16:
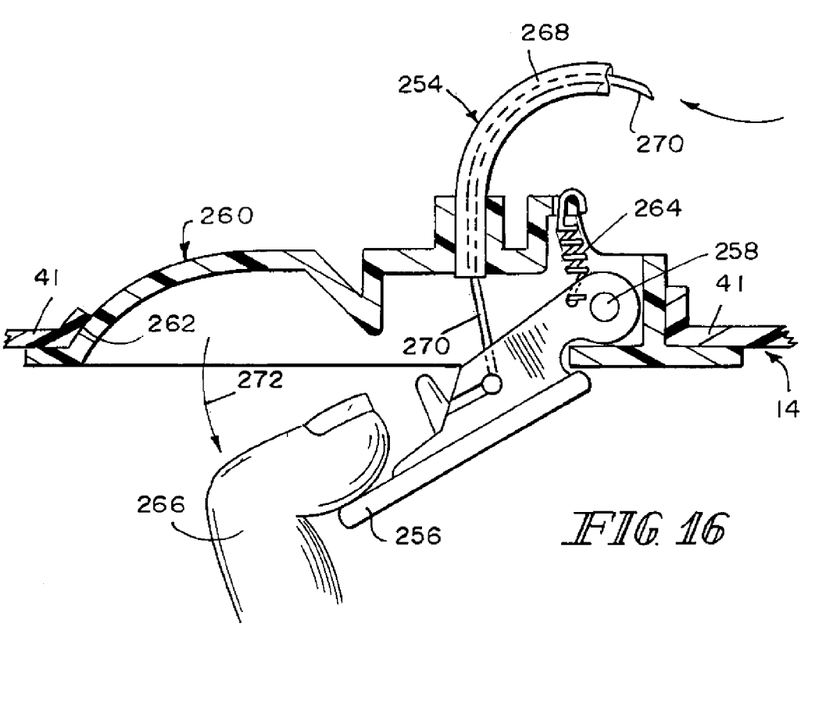
FIG. 16 is a sectional view similar to FIG. 15 showing pivoting motion of the actuator lever about a vertical pivot axis to activate a linkage interconnecting the actuator lever and the hook to cause the hook to move from the locked position shown, for example, in FIG. 12 to the unlocked position shown, for example, in FIGS. 10 and 13.
Figure 41:
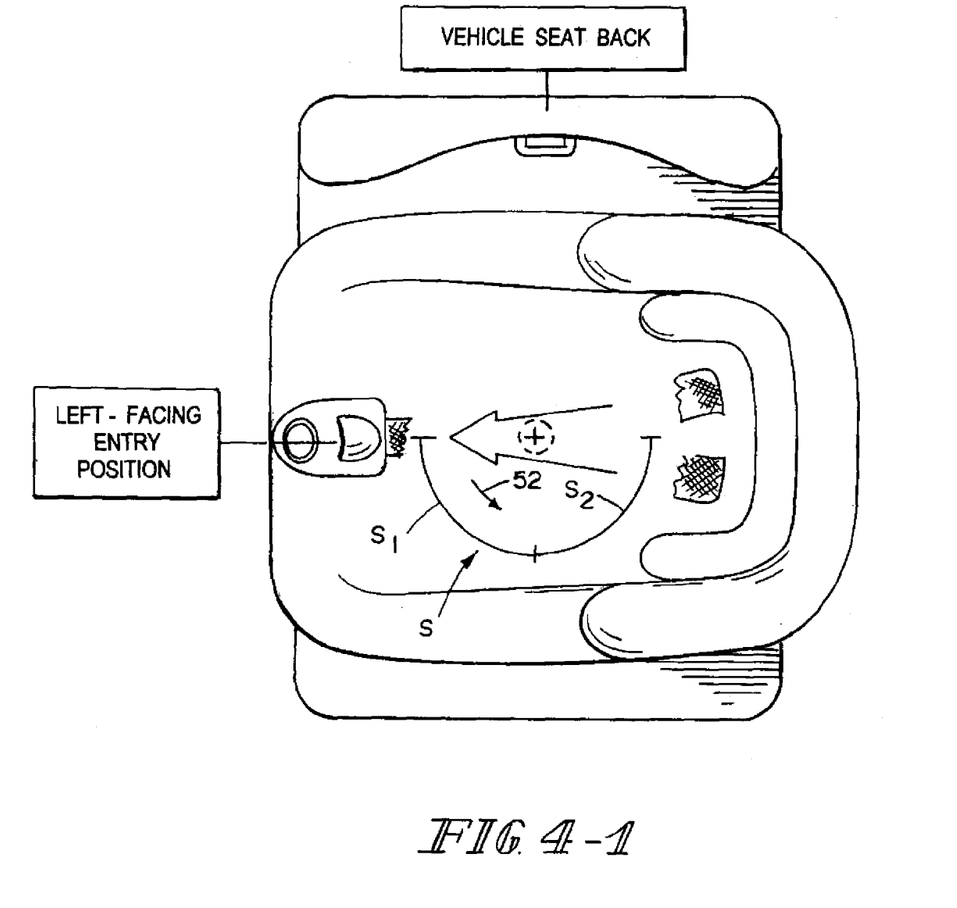
Figure 42:
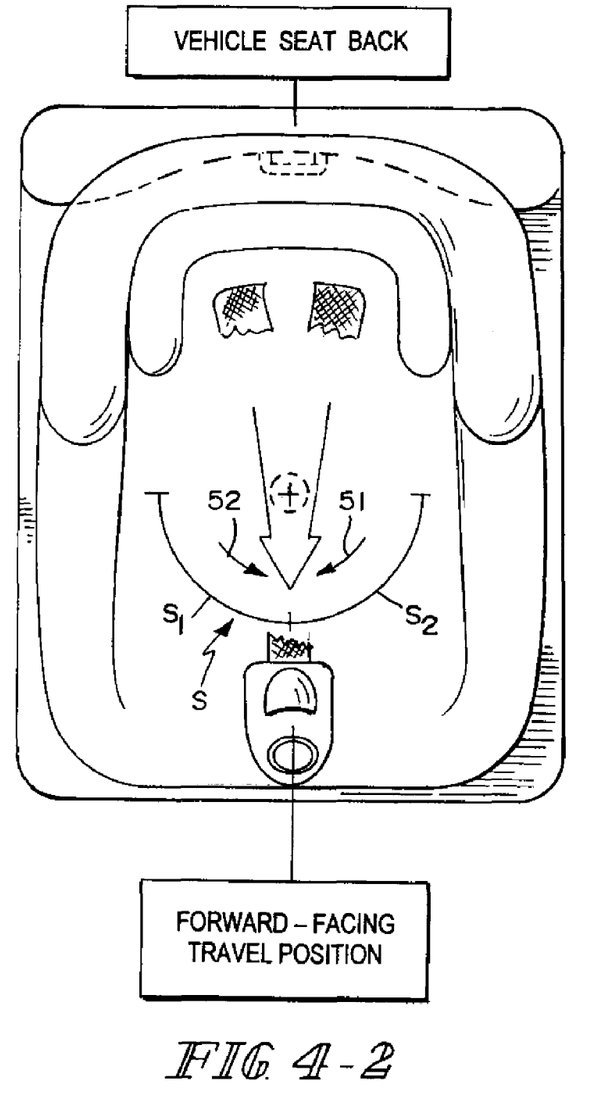
Figure 43:
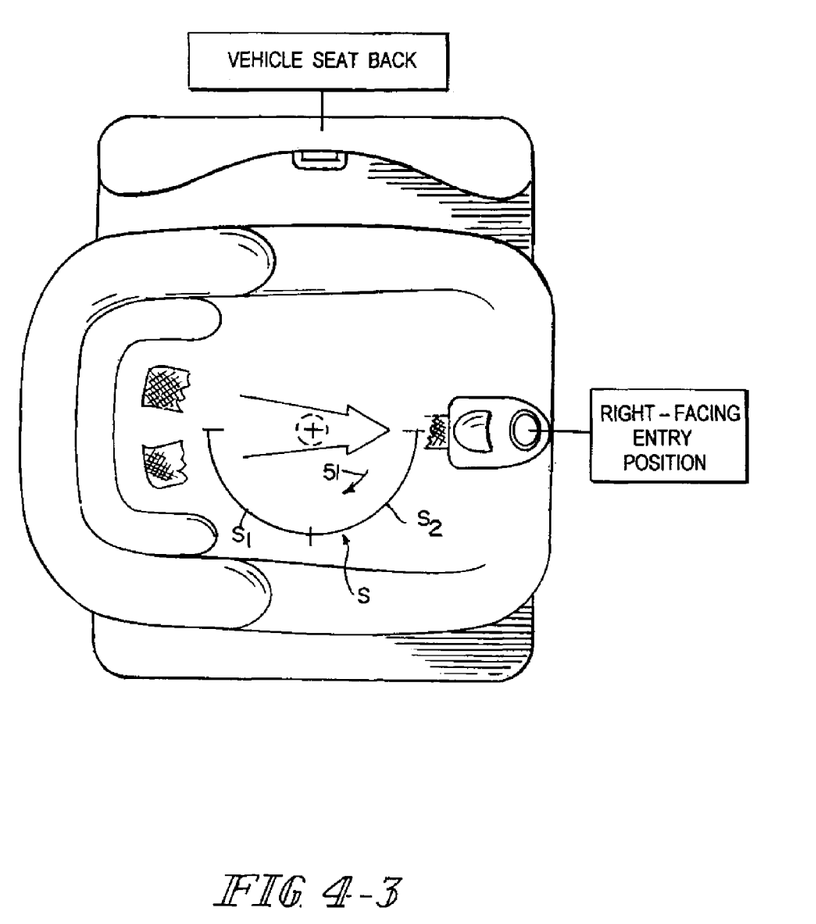

An illustrative hook-release controller 153 is coupled to first armrest 41 and is shown, for example, in FIGS. 15 and 16. Hook-release controller 153 includes an actuator lever 256 mounted for pivotable movement on a pivot post 258 coupled to a housing 260 mounted in an aperture 262 formed in armrest 41. Hook-release controller 153 also includes a return spring 264 coupled to housing 260 and actuator lever 256. Return spring 264 is configured to provide means for yieldably moving actuator lever 256 from an extended position shown away from housing 260 in FIG. 16 to a retracted position in housing 260 shown in FIG. 15 whenever a caregiver 266 releases actuator lever 256.

An illustrative linkage 254 includes a tube 268 coupled to housing 260 and a control wire 270 extending through a passageway formed in tube 268 as suggested in FIGS. 15 and 16. Control wire 270 is coupled at one end to actuator lever 256 as suggested in FIGS. 15 and 16 and at an opposite end to axle mount 89 of hook 80 as shown in FIGS. 10-12. Pivoting movement of actuator lever 256 about pivot post 258 in direction 272 as suggested in FIG. 16 pulls on control wire 270 to cause hook 80 to pivot from the locked position shown in FIG. 12 to the unlocked position shown in FIG. 10. Spring-loaded hook-retainer latches 81, 82 engage plate flanges 91, 92 on hook 80 to retain hook 80 in that unlocked position until hook-retainer latches 81, 82 later engage U-shaped anchor rail 73 of stationary seat anchor 20 during swiveling motion of juvenile seat 14 toward the forward-facing travel position shown in FIGS. 2, 7, and 12.

The invention claimed is:

1. A child restraint comprising
a seat support including a base adapted to set on a vehicle seat and configured to include a swivel-mount pad and an upright anchor-support pad extending upwardly from the swivel-mount pad, the seat support further including a swivel coupled to the swivel-mount pad,
a juvenile seat mounted on the swivel for swiveling motion on an arc relative to the base about an axis of rotation along a first portion of the arc between a left-facing entry position and a forward-facing travel position and along a second portion of the arc between the forward-facing travel position and a right-facing entry position, the juvenile seat including a seat bottom coupled to the swivel for swiveling motion about the axis of rotation and a seat back arranged to extend upwardly from the seat bottom for motion therewith, and
seat stop means for selectively retaining the juvenile seat in the forward-facing travel position to block rotation of the juvenile seat about the axis of rotation toward the left-facing and right-facing entry positions, the seat stop means including a seat anchor coupled to the anchor-support pad of the base and a seat-back lock coupled to the seat back of the juvenile seat, the seat-back lock including latch means for mating with the seat anchor to block rotation of the juvenile seat about the axis of rotation upon arrival of the juvenile seat at the forward-facing travel position, and wherein the seat back is formed to include first and second seat-anchor guide channels and a central opening arranged to lie between and communicate with the first and second seat-anchor guide channels, and the seat-back lock is arranged to extend through the central opening formed in the seat back to mate with the seat anchor upon arrival of the juvenile seat at the forward-facing travel position.

2. The child restraint of claim 1, wherein the first seat-anchor guide channel is funnel-shaped and configured to converge in a first direction toward the central opening to provide means for guiding the seat anchor to mate with the latch means as the juvenile seat rotates along the first portion of the arc from the left-facing entry position to the forward-facing travel position.

3. The child restraining of claim 2, wherein the first seat-anchor guide channel is defined by first upper and lower guide walls converging in the first direction toward the central opening and a first rear wall interconnecting the first upper and lower guide walls.

4. The child restraint of claim 2, wherein the second seat-anchor guide channel is funnel-shaped and configured to converge in an opposite second direction toward the central opening to provide means for guiding the seat anchor to mate with the latch means as the juvenile seat rotates along the second portion of the arc from the right-facing entry position to the forward-facing travel position.

5. The child restraint of claim 4, wherein the first seat-anchor guide channel is defined by first upper and lower guide walls converging in the first direction toward the central opening and a first rear wall interconnecting the first upper and lower guide walls and the second seat-anchor guide is defined by second upper and lower guide walls converging in the opposite second direction toward the central opening and a second rear wall interconnecting the second upper and lower guide walls.

6. The child restraint of claim 1, wherein the first seat-anchor guide channel is defined by first upper and lower guide walls converging in a first direction toward the central opening and a first rear wall interconnecting the first upper and lower guide walls and the second seat-anchor guide is defined by second upper and lower guide walls converging in the opposite second direction toward the central opening and a second rear wall interconnecting the second upper and lower guide walls.

7. The child restraint of claim 6, wherein the first and second lower guide walls cooperate to form a lower surface formed to include a first opening, the first and second rear walls cooperate to form a rear surface formed to include a second opening, the first and second upper guide walls cooperate to form an upper surface formed to include a third opening, the seat back also includes a top surface arranged to merge with the upper surface and formed to include a fourth opening, and the first, second, third, and fourth openings cooperate to define the central opening.

8. The child restraint of claim 7, wherein the latch means includes a finger configured to mate with the seat anchor and the finger is arranged to extend upwardly through the first opening.

9. The child restraint of claim 7, wherein the latch means includes a finger configured to mate with the seat anchor and the finger is arranged to extend upwardly through the first opening and into the fourth opening upon mating engagement of the finger and the seat anchor.

10. The child restraint of claim 1, wherein the seat anchor is arranged to lie in a stationary position on the anchor-support pad, the first seat anchor guide channel is configured to provide means for receiving and guiding the seat anchor during clockwise swiveling motion of the juvenile seat about the axis of rotation relative to the base from the left-facing entry position to the forward-facing travel position to cause the seat anchor to mate with the latch means to cure any misalignment of the latch means and seat anchor that may exist, and the second seat anchor guide means is configured to provide means for receiving and guiding the seat anchor during counterclockwise swiveling motion of the juvenile seat about the axis of rotation relative to the base from the right-facing entry position to the forward-facing travel position to cause the seat anchor to mate with the latch means to cure any misalignment of the latch means and the seat anchor that may exist.

11. The child restraint of claim 10, wherein the latch means includes a hook that is configured to extend through the central opening and mate with the seat anchor whenever the juvenile seat is swiveled relative to the base to assume the forward-facing travel position, the hook is mounted for pivotable movement about a horizontal pivot axis on a pivot shaft coupled to the seat back between a locked position engaged to the seat anchor and an unlocked position disengaged from the seat anchor, and the latch means further includes means for yieldably urging the hook toward the locked position so that the hook assumes the locked position upon arrival of the juvenile seat at the forward-facing travel position.

12. The child restraint of claim 11, further comprising hook-mover means for pivoting the hook about the horizontal pivot axis to assume the unlocked position to allow swiveling motion of the seat back about the axis of rotation relative to the base away from the forward-facing travel position.

13. The child restraint of claim 12, wherein the hook-mover means includes a hook-release controller coupled to the juvenile seat and a linkage arranged to couple the hook-release controller to the hook.

14. The child restraint of claim 13, wherein the hook-release controller is mounted on a seat arm included in the juvenile seat.

15. The child restraint of claim 11, further comprising a hook-release controller coupled to an armrest included in the juvenile seat and linkage means for operatively coupling the hook-release controller to the hook so that a user can move the hook to the unlocked position to disengage the hook from the seat anchor whenever an operation desires to swivel the juvenile seat about the axis of rotation relative to the base from the forward-facing travel position to one of the left-facing entry position and right-facing entry position so that a child can be seated easily in the juvenile seat while the base is fixed in a stationary position on a vehicle seat.

16. The child-restraint of claim 11, wherein the seat anchor includes an anchor bar foundation located in an interior region of the anchor-support pad and an anchor bar coupled to the anchor bar foundation and arranged to extend through the central opening and the anchor bar includes a U-shaped anchor rail located between the anchor-support pad and the seat back and arranged to mate with the hook upon arrival of the juvenile seat at the forward-facing travel position.

17. A child restraint comprising
a seat support including a base adapted to set on a vehicle seat and configured to include a swivel-mount pad and an upright anchor-support pad extending upwardly from the swivel-mount pad, the seat support further including a swivel coupled to the swivel-mount pad,
a juvenile seat mounted on the swivel for swiveling motion on an arc relative to the base about an axis of rotation along a first portion of the arc between a left-facing entry position and a forward-facing travel position and along a second portion of the arc between the forward-facing travel position and a right-facing entry position, the juvenile seat including a seat bottom coupled to the swivel for swiveling motion about the axis of rotation and a seat back arranged to extend upwardly from the seat bottom for motion therewith, and
a seat stop including a seat anchor coupled to the anchor-support pad of the base and a seat-back lock coupled to the seat back of the juvenile seat and configured to mate with the seat anchor to block rotation of the juvenile seat about the axis of rotation upon arrival of the juvenile seat at the forward-facing travel position, and wherein the seat back is formed to include first and second seat-anchor guide channels and a central opening arranged to lie between and communicate with the first and second seat-anchor guide channels, and the seat-back lock is arranged to extend through the central opening formed in the seat back to mate with the seat anchor upon arrival of the juvenile seat at the forward-facing travel position.

18. The child restraint of claim 17, wherein the first seat-anchor guide channel is funnel-shaped and configured to converge in a first direction toward the central opening to provide means for guiding the seat anchor to mate with the seat-back lock as the juvenile seat rotates along the first portion of the arc from the left-facing entry position to the forward-facing travel position.

19. The child restraint of claim 18, wherein the second seat-anchor guide channel is funnel-shaped and configured to converge in an opposite second direction toward the central opening to provide means for guiding the seat anchor to mate with the seat-back lock as the juvenile seat rotates along the second portion of the arc from the right-facing entry position to the forward-facing travel position.

20. The child restraint of claim 17, wherein the first seat-anchor guide channel is defined by first upper and lower guide walls converging in a first direction toward the central opening and a first rear wall interconnecting the first upper and lower guide walls and the second seat-anchor guide is defined by second upper and lower guide walls converging in the opposite second direction toward the central opening and a second rear wall interconnecting the second upper and lower guide walls.

* * * * *